Figure 1:
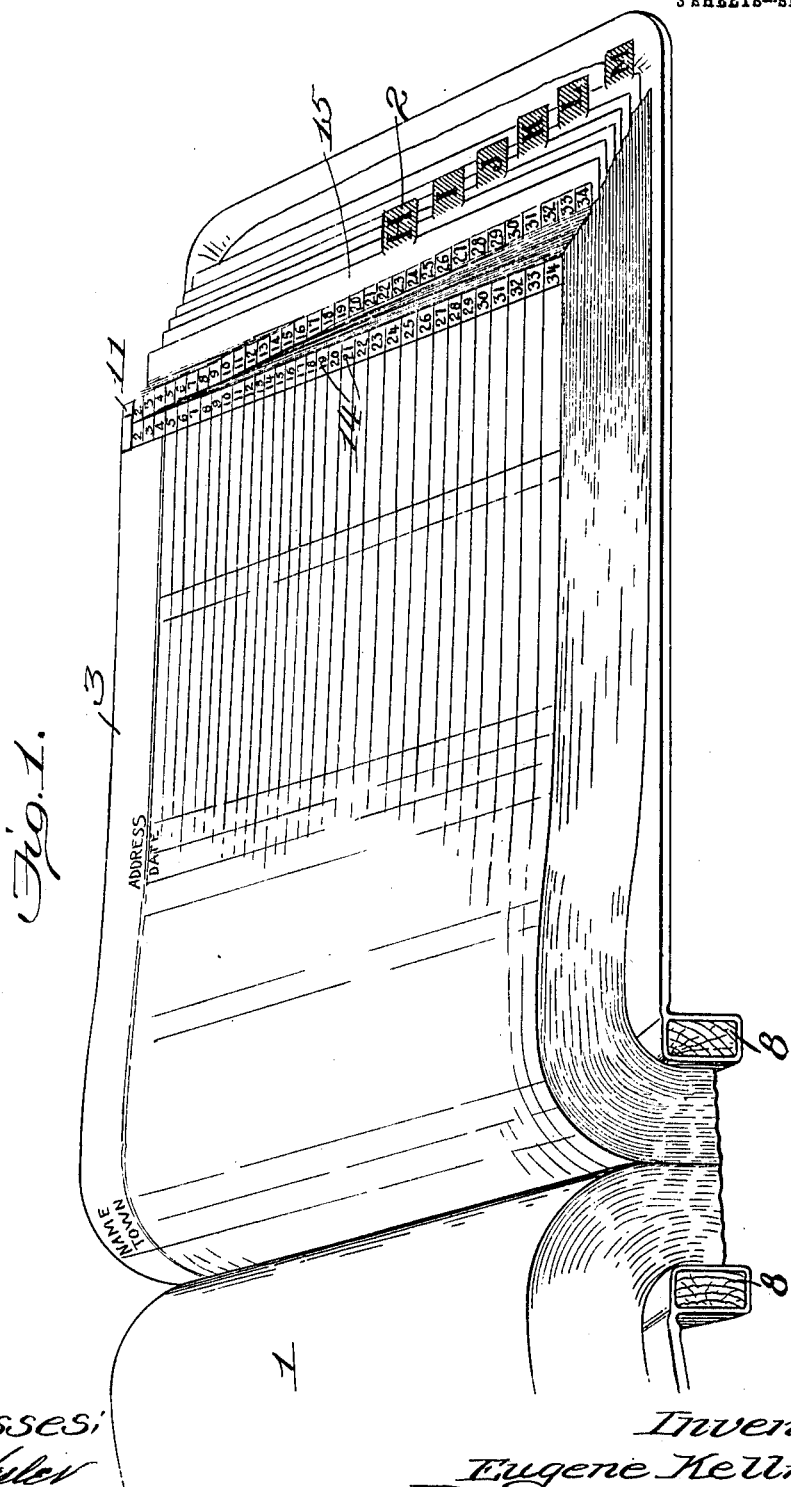

E. KELLNER.
LEDGER WITH VISIBLE INDEX.
APPLICATION FILED SEPT. 28, 1908.

955,807.

Patented Apr. 19, 1910.
3 SHEETS—SHEET 1.

E. KELLNER.
LEDGER WITH VISIBLE INDEX.
APPLICATION FILED SEPT. 28, 1908.

955,807.

Patented Apr. 19, 1910.

Witnesses:

Inventor
Eugene Kellner
By James L. Norris
Atty.

E. KELLNER.
LEDGER WITH VISIBLE INDEX.
APPLICATION FILED SEPT. 28, 1908.
955,807.
Patented Apr. 19, 1910.
3 SHEETS—SHEET 3.
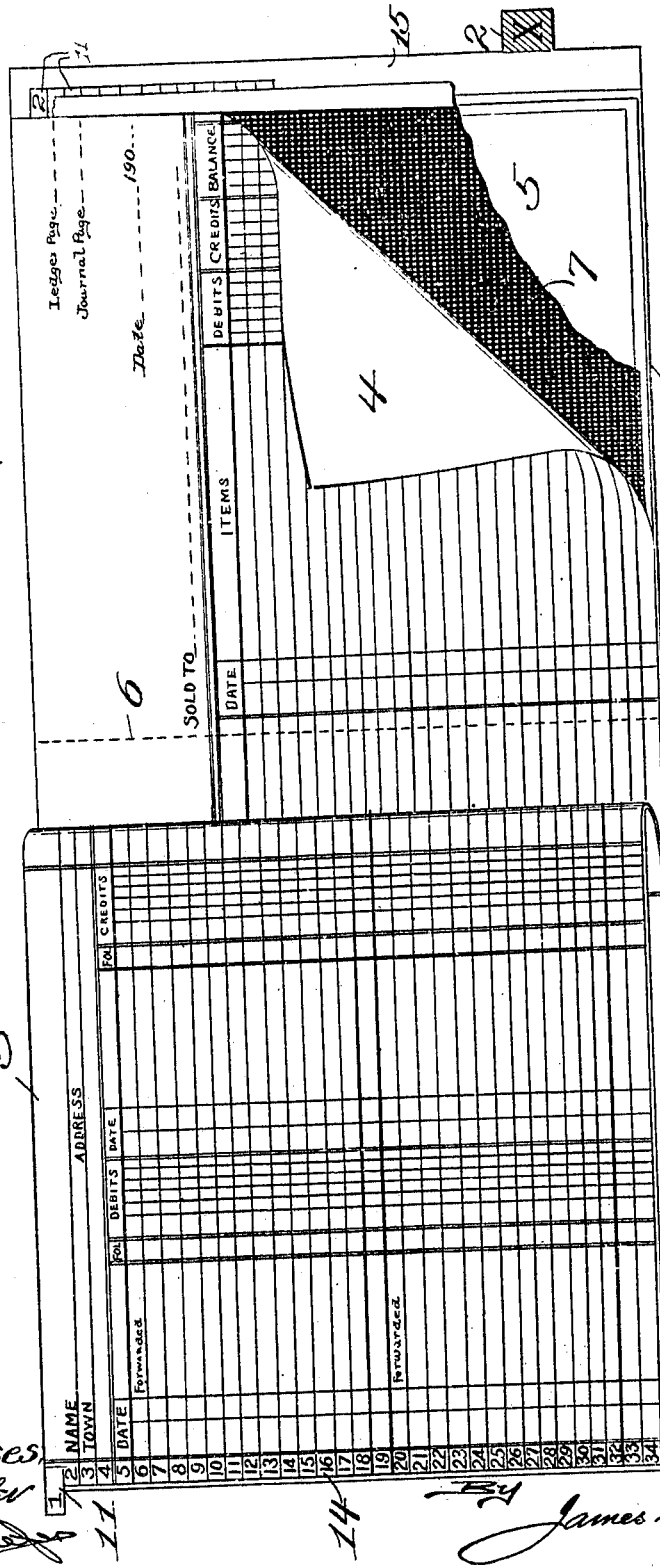

UNITED STATES PATENT OFFICE.

EUGENE KELLNER, OF WACO, TEXAS, ASSIGNOR OF ONE-HALF TO BENJAMIN HOOD HILL, OF WACO, TEXAS.

LEDGER WITH VISIBLE INDEX.

955,807.  Specification of Letters Patent.  Patented Apr. 19, 1910.

Application filed September 28, 1908. Serial No. 454,952.

*To all whom it may concern:*

Be it known that I, EUGENE KELLNER, a citizen of the United States, residing at Waco, in the county of McLennan and State of Texas, have invented new and useful Improvements in Ledgers with Visible Indexes, of which the following is a specification.

My present invention relates to improvements in indexes, and it has for its object primarily to provide an improved index for ledgers and other books wherein the names of the accounts may be entered in a column, the said column being provided with a row of numerals or other identifying characters, one of which is arranged opposite to the space for each name, the ledger sheets of the respective accounts being also provided with tabs which are numbered so as to correspond with the numbers or characters opposite to the names of the accounts in said column, the two sets of identifying characters or numerals being arranged so as to register whereby the tab on the ledger sheet corresponding in number to that opposite to the name of the account may be immediately located and the account desired may be found with the greatest facility.

Another object of the invention is to provide an improved book of this character wherein the ledger, statement and journal sheets are temporarily bound so that new statement and journal sheets may be inserted from time to time after the preceding statements have been rendered, and the ledger sheets may be printed upon both sides and are capable of being reversed so as to enable the entries to be made upon both sides thereof, thus doubling the capacity of the book.

A further object of the invention is to provide an improved ledger which, though simple and comparatively cheap in its construction, contains a set of statement sheets adapted to receive the original entries of items of all transactions and a corresponding set of ledger sheets to which the balance from the statement sheets may be transferred at suitable intervals, an original and duplicate statement sheet being provided for each account and being arranged next to the corresponding ledger sheet and these statement sheets are detachable so as to enable the original statement to be removed and rendered at any time, and the duplicate statement may be removed and filed away by the bookkeeper as a journal sheet, the single book being complete in itself so as to dispense with the necessity of using any additional books in the keeping of the accounts.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a perspective view of a ledger provided with an index embodying my present invention; Fig. 2 represents a section of pages of the ledger and index shown in the preceding view; Fig. 3 is a view similar to Fig. 2 showing the ledger sheet and the statement and journal sheets turned back so as to expose the reverse side of the next adjacent ledger sheet; and Fig. 4 is a view showing the section of the book in open condition illustrating a statement sheet adapted to receive the items at one side of the book, and the corresponding ledger sheet adapted to receive the entries of the balances of the statement at the opposite side of the book. Fig. 5 represents a sectional view of the outer edge of the division sheet 1 showing the stiffened extension thereof.

Similar parts are designated by the same reference characters in the several views.

In the accompanying drawings, I have shown the invention as applied to account books, although it is to be understood that the invention is not necessarily so limited, as the improved index is capable of use in connection with books of various kinds, and certain modifications and changes in the specific construction of the book and in the arrangement of the sheets, pages and other parts may be made in order that the invention may be applied to the best advantage in each particular case.

In the present instance, the accounts are arranged alphabetically, that is to say, all accounts are grouped according to the initial letter thereof, suitable division sheets 1 being provided between the several groups of accounts which are provided with index tabs 2 corresponding to the appropriate letter of the alphabet. Between each pair of division sheets are arranged a suitable number of pages to accommodate the accounts under one particular letter of the alphabet, each set of pages comprising a ledger sheet 3, an original statement sheet 4 and a duplicate or journal sheet 5, a set of these three sheets being provided for each account. The original statement sheet 4 is ruled in the form of a bill or statement and is adapted to have the items of the different sales as made entered thereon from time to time, this statement being preferably provided with debits and credits columns and a balance column and, in order to enable the statement to be readily detached from the book in rendering the statement to the customer, it is provided with a row of perforations or a weakening line 6 whereby the body of the statement may be readily torn from the book. Ordinarily, these statements are rendered monthly or they may be rendered at any other suitable intervals, and the balance from each statement is transferred to the ledger sheet, the latter being preferably ruled in ledger form, and in the present instance is provided with a suitable number of lines to receive an entry for each month through a period of two years. When the book is opened to an account, the statement is exposed at one side of the book so as to receive the items and the ledger sheet is exposed at the opposite side of the book to receive the entries from the statement of the corresponding account, the top of the ledger sheet being adapted to receive the name of the account. In order to provide a duplicate record of each statement rendered, a duplicate sheet 5 is arranged beneath the statement sheet for each account, and a carbon or copying sheet 7 may be interposed between the original and duplicate sheets so that the entries of items on the original statement will be duplicated upon the second statement sheet, and the latter may be detached at the same time the original statement sheet is detached and this duplicate statement may be filed away as a journal sheet. A set of these three sheets, namely, a ledger sheet, and the original and duplicate statement sheets is provided for each account.

In order to enable fresh statement sheets to be applied to the book after the rendering of a preceding statement, a temporary binding for the pages of the book is preferably provided, and any appropriate binding of this character may be employed. In the present instance, a pair of clamping members 8 are provided which may be locked so as to clamp and secure the pages of the book, whereby pages may be introduced and removed as desired. Any suitable binder may, however, be used.

In order to utilize the book to the greatest advantage, each ledger sheet is preferably reversible, that is to say, it is provided with a ledger ruling upon both sides thereof, the ruling upon one side being upside down or in reverse relation to that upon the other side of this sheet as shown in Fig. 3 so that after one side of the sheet has been filled with entries from the statements, the binding of the book may be loosened and this particular ledger sheet may be removed and inverted and then re-applied and bound, and by inverting the ruling upon the two sides of the ledger sheet, it is necessary to perforate the edge of the sheet for the binder only at one edge thereof.

In order to facilitate the work of indexing the accounts and of locating the different accounts by means of the index, each ledger sheet is provided with an index tab 11 which is pasted or otherwise fastened to its free edge, and these tabs are provided with suitable identifying characters. In the present instance, numerals are employed which are arranged progressively and in sequence, the first ledger sheet being provided with a tab beginning, for instance, with the numeral 1, and the next ledger sheet in order having a tab which is arranged immediately next to the tab first mentioned and is provided with the numeral 2, and these tabs of the several ledger sheets progress in stepped order from one edge, preferably the top edge of the book, toward the opposite or bottom edge thereof so that all of these tabs are visible, and by arranging them in sequence, the desired number may be instantly located. In entering the name of each account in the index, a number is given to this particular account which corresponds to the number of the tab on the appropriate ledger sheet.

In the index shown, an index sheet 12 is bound in the book at the beginning of each set of accounts under a given letter of the alphabet, and this index sheet is provided with a column which is adapted to receive the entries of the names of all accounts under this particular letter of the alphabet as such accounts are opened, and a row of numerals 13 is provided preferably at the free edge of this index sheet so that one number of this column of numerals is arranged opposite to each name as entered. This column of numerals or identifying characters opposite to the name of the accounts on the index sheet is so arranged that it is immediately adjacent to the row of exposed tabs on the several ledger sheets, the numbers of the tabs being arranged to register with the corresponding number in the row of numerals on the index sheet so that the moment the name of the account is located on the index sheet, the number on the same line opposite to such name registers with the corresponding number on the ledger sheet containing such account, and by grasping this tab, the book may be instantly opened to the desired account. This index sheet may also be ruled so as to contain the entries of sundry accounts or accounts which do not require the opening of an individual set of pages such a ruling being shown in Figs. 2 and 3.

In order to facilitate the placing of the identifying tabs upon the ledger sheets, each of these sheets is preferably provided at its free edge with a column of numerals 14 which corresponds to the column of numerals 13 upon the edge of the index sheet, each tab being superposed upon the corresponding number at the edge of the ledger sheet, thereby insuring a progressive arrangement of these tabs upon the book.

The division sheets or pages 1 which carry the tabs 2 bearing the different letters of the alphabet are provided with stiffened extensions 15 which extend preferably from the top to the bottom of the page and project ledge-like over the row of tabs on the ledger sheets, so that each set of tabs is protected by the extension of its corresponding division sheet, and hence any tendency of these tabs to become torn off is prevented.

Fig. 5 shows in section a portion of the division sheet 1 and its stiffened extension 15, this stiffened extension being produced preferably by lapping the relatively tough but thin paper composing the division sheet about a strip 16 of thick and stiff cardboard or other relatively rigid material.

The visible index not only enables the sheets containing the desired account to be readily found, but the operation of entering the names of the accounts when opened is facilitated, as these may be entered without any particular reference to the spelling of the name, excepting the initial letter, and as each name is entered in the index, a number or identifying character is assigned to it, and by arranging the corresponding sheets opposite to these names, the appropriate tab may be instantly located and the necessity of reversing the edges of the pages is obviated. The index, however, may be used not only in connection with a ledger as described, but may be used as an index generally, in connection with books of various kinds.

Account books embodying my present invention enable accounts to be kept with the greatest facility and the opportunities of error are minimized, as a single book is ordinarily sufficient to receive directly the items as the sales are made, and the balances from the statement sheet are directly transferred to the ledger sheet, it being possible to readily remove and render a statement at any desired time, and as a duplicate statement is made with the original, a complete record of all items may be had. By ruling the ledger sheets on both sides and in inverted relation, the life of the book may be doubled, and as the sheets are temporarily bound or assembled, the book may be used perpetually.

I claim as my invention:

1. A ledger comprising a plurality of sections each of which consists of an index sheet provided with a straight edge and having a column ruled appropriately to form a row of spaces, a set of identifying characters on said index sheet arranged parallel to the straight edge thereof, one of said characters arranged opposite to each space in said column, a ledger sheet also having a straight edge and provided with a separately formed and attached tab projecting outwardly from said edge and bearing a character identical with a character on the index sheet, said tab being offset outwardly beyond the edge of the ledger sheet and arranged in alinement with a like character on the index sheet, and a flexible tab sheet following the ledger sheet and having a stiffened extension projecting outwardly beyond and overlapping said tab of the ledger sheet, said extension being of uniform width and extending from top to bottom of the ledger sheet.

2. A ledger comprising a plurality of sections each of which consists of an index sheet provided with a straight edge extending from top to bottom and having a column ruled appropriately to form a row of spaces, a set of numerals arranged in numerical order at, and parallel to said edge of said sheet and each opposite to one of the spaces of said column, and a set of ledger sheets having straight edges extending from top to bottom thereof and containing tabs projecting outwardly from said straight edges and bearing identifying characters identical with those upon the index sheet, the ledger sheets containing the tabs being also provided adjacent to their edges with characters identical with and arranged immediately beneath those upon the index sheet, the characters upon the tabs being offset outwardly beyond the edges of all the sheets and arranged in alinement with the identical characters thereon, and flexible division sheets arranged beneath the ledger sheets and provided with stiffened extensions which project outwardly to form ledges which overlie and protect the tabs on the ledger sheets, said stiffened extensions being of uniform width and extending continuously from top to bottom of the ledger sheets.

3. A ledger comprising a plurality of sections each of which consists of an index sheet having a straight lateral edge which extends from top to bottom thereof and also provided with a column ruled appropriately to form a row of spaces, a set of identifying characters arranged adjacent and parallel to the said straight edge of the index sheet, one character being opposite to each of the spaces in said column, a set of ledger sheets of the same size and shape as the index sheet, a set of tabs formed separately from and attached to the edges of the ledger sheets, each tab having a character which is arranged opposite to a corresponding character adjacent to the edge of the index sheet, said tabs projecting outwardly beyond the edges of the index and ledger sheets, and a division sheet comprising a flexible body underlying the ledger sheets and a stiffened extension which projects outwardly beyond the tab-bearing edges of the ledger sheets, the stiffened portion of the division sheet being of uniform width and extending from top to bottom of the ledger sheets and overlying and protecting the tabs thereon.

In testimony whereof I have hereunto set my hand in presence of two subscribing witnesses.

EUGENE KELLNER.

Witnesses:
C. M. CLAPP,
G. M. YARBROUGH.